US007620593B1

(12) United States Patent
Fultz (10) Patent No.: US 7,620,593 B1
(45) Date of Patent: Nov. 17, 2009

(54) METHOD FOR CAPITAL CREATION FOR TAX-EXEMPT ORGANIZATIONS

(76) Inventor: Leigh S. Fultz, 305 Johns Bluff Rd., Lewisville, NC (US) 27203

(*) Notice: Subject to any disclaimer, the term of this patent is extended or adjusted under 35 U.S.C. 154(b) by 1151 days.

(21) Appl. No.: 10/184,780

(22) Filed: Jun. 27, 2002

(51) Int. Cl.
*G06Q 40/00* (2006.01)
(52) U.S. Cl. .......................... 705/38; 705/35; 705/36 T
(58) Field of Classification Search .............. 705/35–45
See application file for complete search history.

(56) References Cited

U.S. PATENT DOCUMENTS

| 5,663,547 | A | * | 9/1997 | Ziarno ........................ 235/380 |
| 5,761,645 | A |   | 6/1998 | Hawkins ........................ 705/4 |
| 5,806,042 | A |   | 9/1998 | Kelly et al. .................... 705/4 |
| 5,864,685 | A |   | 1/1999 | Hagan ........................ 395/235 |
| 5,926,800 | A |   | 7/1999 | Baronowski et al. .......... 705/35 |
| 5,974,390 | A |   | 10/1999 | Ross .............................. 705/4 |
| 6,192,347 | B1 | * | 2/2001 | Graff ........................ 705/36 R |
| 6,301,574 | B1 | * | 10/2001 | Thomas et al. ................. 707/1 |
| 6,430,542 | B1 |   | 8/2002 | Moran |
| 6,611,807 | B1 | * | 8/2003 | Bernheim et al. ......... 705/36 R |
| 7,191,148 | B1 | * | 3/2007 | Butcher ........................ 705/35 |
| 2001/0011223 | A1 | * | 8/2001 | Burke ............................ 705/4 |
| 2001/0049612 | A1 |   | 12/2001 | Davis |
| 2002/0013750 | A1 | * | 1/2002 | Roberts et al. ................ 705/35 |
| 2002/0016758 | A1 | * | 2/2002 | Grigsby ........................ 705/36 |
| 2002/0077955 | A1 | * | 6/2002 | Ramm ........................ 705/37 |
| 2002/0138381 | A1 | * | 9/2002 | Tomecek ..................... 705/36 |
| 2002/0165740 | A1 | * | 11/2002 | Saunders ....................... 705/4 |
| 2002/0178039 | A1 | * | 11/2002 | Kennedy ....................... 705/7 |
| 2003/0065616 | A1 | * | 4/2003 | O'Donnell, Jr. .............. 705/39 |
| 2003/0191672 | A1 | * | 10/2003 | Kendall et al. ................. 705/4 |
| 2008/0183488 | A1 | * | 7/2008 | Vianello ........................ 705/1 |

FOREIGN PATENT DOCUMENTS

| WO | WO 95/23379 | 8/1995 |
| WO | WO 02/39644 | 5/2002 |

OTHER PUBLICATIONS

Charitable Planned Giving; Horowitz, Steven A., Taxes, Chicago, Nov. 1994, vol. 72, Iss. 11, p. 685.*
Charitable Trusts (http://web.archive.org/web/*/http://www.savewealth.com/planning/estate/charitabletrusts/) dated Feb. 15, 2001.*
Control and restricted securities, Barron, Robert A., Securities Regulation Law Journal, New York: Spring 1998, vol. 26, Iss. 1; p. 123, 4 pgs.*

* cited by examiner

*Primary Examiner*—James Kramer
*Assistant Examiner*—Rajesh Khattar
(74) *Attorney, Agent, or Firm*—Steven J. Hultquist; Intellectual Property/Technology Law (57) ABSTRACT

A method for enabling a qualified organization to raise or borrow an amount of capital that is required for a planned project and for subsequently eliminating the obligation to repay the debt principal comprises establishing a pool of potential investors to receive an offer to purchase tax-exempt bonds of the qualified organization in order to raise the capital required by the qualified organization, offering the tax-exempt bonds to selected investors in the pool of potential investors, receiving an amount of funds from at least one selected investor to purchase the tax-exempt bonds; establishing an individual charitable remainder trust with the tax-exempt bonds of the qualified organization contributed as assets by the at least one selected investor, and specifying the qualified organization as a residual beneficiary of the charitable remainder trust.

1 Claim, 4 Drawing Sheets

| Investor Name | Date of Birth | Spouse Name | Date of Birth | Investor Address | Estimated Annual Income | Affiliation |
|---|---|---|---|---|---|---|
| | | | | | | |

INVESTOR POOL DATABASE

FIG. 3

METHOD FOR CAPITAL CREATION FOR TAX-EXEMPT ORGANIZATIONS

BACKGROUND OF THE INVENTION

Low cost, tax-exempt financing is available to all state and local governments (i.e., cities, counties, townships, school districts, special districts, and authorities) as well as for many tax-exempt 501(c)(3) institutions such as hospitals, universities, colleges and volunteer fire departments. Tax-exempt financing through the sale of tax-exempt bonds offers practical financial alternatives to paying cash for capital expenditures by state and local government units and tax-exempt institutions. Simply stated, a bond is a debt instrument that is issued for a period of more than one year, with the purpose of raising capital by borrowing. The Federal government, states, cities, corporations, universities, and many other types of institutions sell bonds. A bond is generally a promise to repay the principal investment amount along with interest on a specified date.

Many different types of projects may qualify for tax-exempt financing. Municipal assets, airports, public transit facilities and vehicles, school buildings, hospitals, nursing homes, manufacturing facilities and other types of projects may qualify. Financing is generally obtained through the issuance of bonds. In addition to complying with state laws that enable the financing of a project, there is also the need to comply with restrictions found in the federal law. Federal tax law may impose limitations on the dollar amount that can be financed with tax-exempt debt. The Federal tax law considerations are very complex, but have fully been considered and complied with in the capital creation process described herein.

SUMMARY OF THE INVENTION

The capital creation process of the present invention enables tax-exempt organizations to develop financing for major capital needs. The focus of the method is on those organizations that are eligible to finance capital projects through the sale of tax-exempt bonds.

The capital creation process provides a system through which a tax-exempt organization can finance its capital needs through the issuance and sale of tax-exempt bonds. Through this method, the institution's obligation is to pay the interest due on those bonds, at the bond's market rate. However, the present invention eliminates the burden of repaying the debt principal itself and reduces the number of, and consequently, the amount of the interest payments as well.

The capital creation process also provides a system for those institutions or organizations eligible to finance major capital obligations with tax-exempt bond financing to substantially enhance their borrowing capacity. The present invention provides a novel method for the integration of several financial planning tools to result in the elimination of the burden of debt repayment of the tax-exempt institution issuing the bonds.

The capital creation process contemplates the novel integration of the following planning tools:
1. Tax-Exempt Bond Issue;
2. Charitable Remainder Annuity Trust (CRAT);
3. Single Premium, or Short Pay, Life Insurance Policies with guaranteed death benefits until at least age 95; and
4. Irrevocable Life Insurance Trust.

In one aspect of the invention, a capital creation process is provided for a qualified (i.e., tax-exempt) organization to raise funds, through the issue of bonds, for capital improvements while eliminating the obligation to ever repay the debt. A pool of potential investors is first established as the individuals that will be first offered an opportunity to purchase tax-exempt bonds in order too raise the desired capital improvement funds. The tax-exempt bonds are offered to selected investors in the pool that meet certain parameters that may include age, wealth and affiliation with the tax-exempt organization issuing the bonds. The qualified organization then receives the proceeds of the bond sale and can immediately use the funds for its capital improvement projects. The investor then establishes an individual charitable remainder trust with the tax-exempt bonds as the asset to be contributed to the trust. The qualified organization is named as the irrevocable residual beneficiary of the trust. Periodically, the charitable remainder trust is paid an annuity representing the interest due on the bond issue. The investor and his spouse, if so named, receive the interest income from the charitable remainder trust for the life of the investor, and the life of the spouse. Upon the death of the investor, and spouse if named, the bonds are returned to the organization, which can then extinguish the liability on its financial statements.

In another aspect of the invention, the investor in the tax-exempt bonds is able to deduct from his individual income tax return, an amount under applicable tax laws for the contribution of the tax-exempt bonds to the charitable remainder trust. He then establishes an irrevocable life insurance trust with the tax savings resulting from the tax deduction. The trustee of this trust then purchases a life insurance policy to replace the amount of wealth contributed to the charitable remainder trust. The investor names his/her heirs or others as beneficiaries of the life insurance trust in at least an amount equal to the purchase price of the tax-exempt bonds. The tax-exempt organization may also be designated as a beneficiary to receive an additional bequest from the investor, particularly if the investor has a strong affiliation with the organization.

Another novel aspect of the capital creation process is a non-binding, but acknowledged intent of the investor to commit his investment (bond purchase) to a charitable remainder annuity trust (CRAT), specifically and irrevocably designated as to the residual distributee, i.e., the qualifying organization, which is also the bond issuer. The specific contribution of the bonds to the CRAT is an integral and necessary part of the capital creation process. By use of this contribution method, the following objectives are met:
1. the CRAT trustee is relieved of the burden of diversification of holdings;
2. the bonds themselves are now positioned to "return" to the institution at the deaths of the income beneficiaries of the CRAT;
3. the income stream to the income beneficiaries is assured;
4. the tax-free nature of the income is assured; and
5. the assets of the CRAT are significantly insulated from creditor claims of both institution and beneficiary creditors.

Some of the benefits of the institutional user of the capital creation process are more specifically identified below. The capital creation process:
1. allows the issuing institution the opportunity to utilize debt financing to a far greater degree than historically possible, as much as 2 times as much debt capacity with no increase in cost;
2. broadens the financial support constituency of the issuing institution;
3. improves the financial ratios and balance sheets of institutional users;
4. gives the investor lifetime tax-free income, more asset transfer potential than would otherwise be available to the investor, and the added benefit of making a substantial gift to the charitable institution involved;

5. provides added creditor protection and security for the investor;
6. accelerates the institution's ability to proceed with capital projects at an earlier date than might otherwise have been possible, thus realizing cost savings and use, both potentially substantial; and
7. provides a platform at a time of enormous increase in capital need and capital gift demands to pursue investment and business relationships as an alternative to the customary funds development philosophy of outright gifts.

BRIEF DESCRIPTION OF THE DRAWINGS

The invention is better understood by reading the following detailed description of an exemplary embodiment in conjunction with the accompanying drawing wherein.

DETAILED DESCRIPTION OF THE INVENTION

The capital creation process of the present invention makes use of several basic financial planning tools that are provided for in the Internal Revenue Code (IRC). The capital creation process utilizes the following elements as part of the method.

1. Tax-exempt financing authority issues tax-exempt bonds for qualifying institutions, organizations, and municipalities as detailed in the IRC §§ 141-150.
2. Older, wealthy individuals invest a significant portion of their assets in tax-exempt income producing opportunities. The age 65 and over demographic segment is growing disproportionally larger than other demographic age groups and offers the prospect of more and more large net worth investors purchasing investment grade, tax-exempt bonds for their portfolios.
3. The subsequent incentive and opportunity for such investors who are financial supporters of one or more charitable organizations to commit certain of their assets, on a deferred basis, to their selected charities, while retaining tax-free income (i.e., the economic benefits of their investments) for life.
4. This is accomplished through the use of Charitable Remainder Annuity Trusts (CRATs), for the realization and deployment of net tax savings generated through the income tax deduction resulting from a contribution to a charitable remainder annuity trust.
5. The availability of life insurance death benefit proceeds, as a wealth replacement tool, exempt from income tax for the donor's selected beneficiaries.
6. The use of Irrevocable Life Insurance Trusts (ILITs), or possibly other vehicles, to provide significant wealth transfer to such beneficiaries that is estate tax free.

The present invention combines various tools into a unique method for capital creation for tax-exempt entities. Through the proper application of the capital creation method, an institution can raise the capital it needs, recognize its obligation to pay interest at the stated rate at time of issue, but can relieve its burden of repaying the debt itself over time. The institution can borrow large amounts, but eliminate the obligation of paying back the debt.

The capital creation process of the present invention is designed to permit an individual to make a substantial contribution to a tax-exempt organization while maintaining the value of his estate for the benefit of his heirs. A brief description of the instruments used in the capital creation process, i.e., Charitable Remainder Trusts (CRT) and Irrevocable Life Insurance Trusts (ILIT) is provided below.

A Charitable Remainder Trust is a trust that provides for a specified distribution, at least annually to one or more beneficiaries, at least one of whom is not a charity, for life or for a term of years with an irrevocable remainder interest to be held for the benefit of, or paid over to, a tax-exempt organization. The specified distribution must be a sum certain which is not less than 5% of the initial net fair market value of all property placed in trust (charitable remainder annuity trust) or a fixed percentage that is not less than 5% of the net fair market value of the trust assets valued annually (charitable remainder unitrust). To qualify as a charitable remainder trust, the trust be either a charitable remainder annuity trust or a charitable remainder unitrust. The trust document must require the periodic payment of the annuity amount that begins in the first year of the CRT to continue for the life of named individuals or for a term of years not to exceed 20 years.

The investor taxpayer may be allowed a charitable deduction, subject to the normal charitable deduction limitations in the year the trust is established. For an annuity trust, the amount of deduction the investor taxpayer is entitled to will be the net fair market value of the property placed in the trust, less the present value of the annuity. Because the grantor maintains an annuity interest in the CRT, the value of the CRT at death is includable in the grantor's estate for estate tax purposes. However, IRC § 2055(a) provides that a grantor is allowed a deduction from the value of the gross estate for bequests to charitable organizations. The amount of the deduction is the value of the property included in the estate and transferred to the charity. Unlike the percentage limitations on the income tax deduction allowed at the time of contribution, there are no percentage limitations on the estate tax deduction.

The second part of the capital creation process transaction contemplates that the investor taxpayer will replace the wealth being donated to the tax-exempt organization in the CRT with the proceeds of a life insurance policy. This transfer of wealth to the investor's heirs may be made free from federal transfer tax by creating and funding an irrevocable life insurance trust. The trustee will acquire a life insurance policy on the life of the investor, or a second to die policy on the investor and the investor's spouse. The trust will own the policy and will be the beneficiary of the policy. The trust instrument names the income and principal beneficiaries of the trust. The investor may make contributions to the trust that are treated as gifts in order to pay the insurance premium if necessary. The capital creation process contemplates the initial contribution to this trust being the tax savings from the deduction of the allowable amount due to the investor's gift to the charitable remainder trust.

There are several advantages to replacing the wealth transferred to the CRT with an equal face value of life insurance. The most significant aspect is that the proceeds of the life insurance policy may be transferred to the beneficiaries free from federal transfer tax. If the investor held assets outside of the CRT at death, the investor's heirs may likely receive less than half of the assets after satisfying the federal estate and other death tax liabilities. By contributing the assets to a CRT, and replacing them with life insurance, 100% of the value of the assets in the form of cash insurance proceeds will be passed down to the heirs. If the insurance policy is held in trust, it is possible to protect the proceeds from both the investor's and the beneficiary's creditors. Upon the death of the investor, the proceeds of the insurance policy are paid directly to the trust as beneficiary.

The following is an example of the tax and economic effects of participation in the capital creation process. Consider donors that are husband and wife, each of whom are 65 years old. The donors purchase $5M of tax-free municipal bonds issued by XYZ University and then contribute those bonds to a Charitable Remainder Annuity Trust (CRAT), which will pay the donors 5% per year over their lifetimes, then the balance to the university. This contribution generates a tax deduction which results in a significant tax savings currently to the investor. Assume further that the CRAT holds the bonds until both the husband and wife die. The second death occurs 20 years after creation of the trust. Assume further that an IRS § 7520 rate of 6% applies. The husband and wife fund an Irrevocable Life Insurance Trust (ILIT) with sufficient funds (the income tax savings just described) to acquire a $5M last-to-die policy. Their children are beneficiaries of the ILIT.

The donor's income tax deduction for the donation to the CRAT is 41.52% of the amount transferred or $2.76M. The cash value of the income tax deduction, assuming the donor's cumulative federal and state income tax rate is 42% is $871.92K. The cash paid to the donors from the CRT is $250K per year. The present value cost to the University for the payment of the interest over 20 years, assuming a present value discount rate of 8%, is approximately $2.45M. The residual available to XYZ University is $5M, more than two times its cost. Over a period of 20 years, the cash paid to the donors from the CRAT is $5M—tax free. The funds available to the children of the husband and wife donors is $5M—tax free. The total amount paid to the investor and heirs would be $10M tax free.

An institution begins the capital creation process by determining the scope of its immediate capital needs. Following that determination, the institution identifies, through a myriad of methods, a constituency of prospective investors who are likely to be interested in (1) acquiring tax-free income via the purchase of tax-exempt bonds; (2) making a major contribution to the issuing institution with minimal, if any, out-of-pocket costs; and (3) passing the assets (bonds or bond value) or their equivalents to the investor's chosen beneficiaries.

The issuance of tax-exempt bonds to an investor provides a life time stream of tax-free income protection security for the investor's family, and the opportunity to be of great assistance to the tax-exempt organization's capital projects. Following the death of the investor and the investor's spouse, the investor's designated heirs should receive funds that are equal to or greater than the after-tax value of the original investment involved, had the investor continued to own the investment until his death. An added benefit of purchasing tax-exempt bonds for the investor is that such purchase will have significant protection from creditor claims.

The investor pool for the tax-exempt bond issue is identified from among the bond issuing entity's financial support constituency, even including a constituency of one, or a handful of investors. The concept of an investor pool is unique in that the general process for such an issue is to retain a bond underwriter who would commit to the purchase of the issue and be responsible for the sale of the bonds to a broad market (i.e., bond funds and investors with no abiding interest or commitment to the issuing institution), with no residual interest to the favor of the issuer, other than the loan itself. The capital creation process offers the issuing institution the opportunity to substantially increase its prospective donor pool with those individuals who are not ready to detach themselves from assets currently, and more specifically, not ready to detach from substantial assets in the form of large capital gifts. However, the capital creation process begins the donative process and relationship with the institution by way of an investment decision and business relationship. The investor is making a loan rather than outright gift to the issuing institution, initially.

Figure 3:
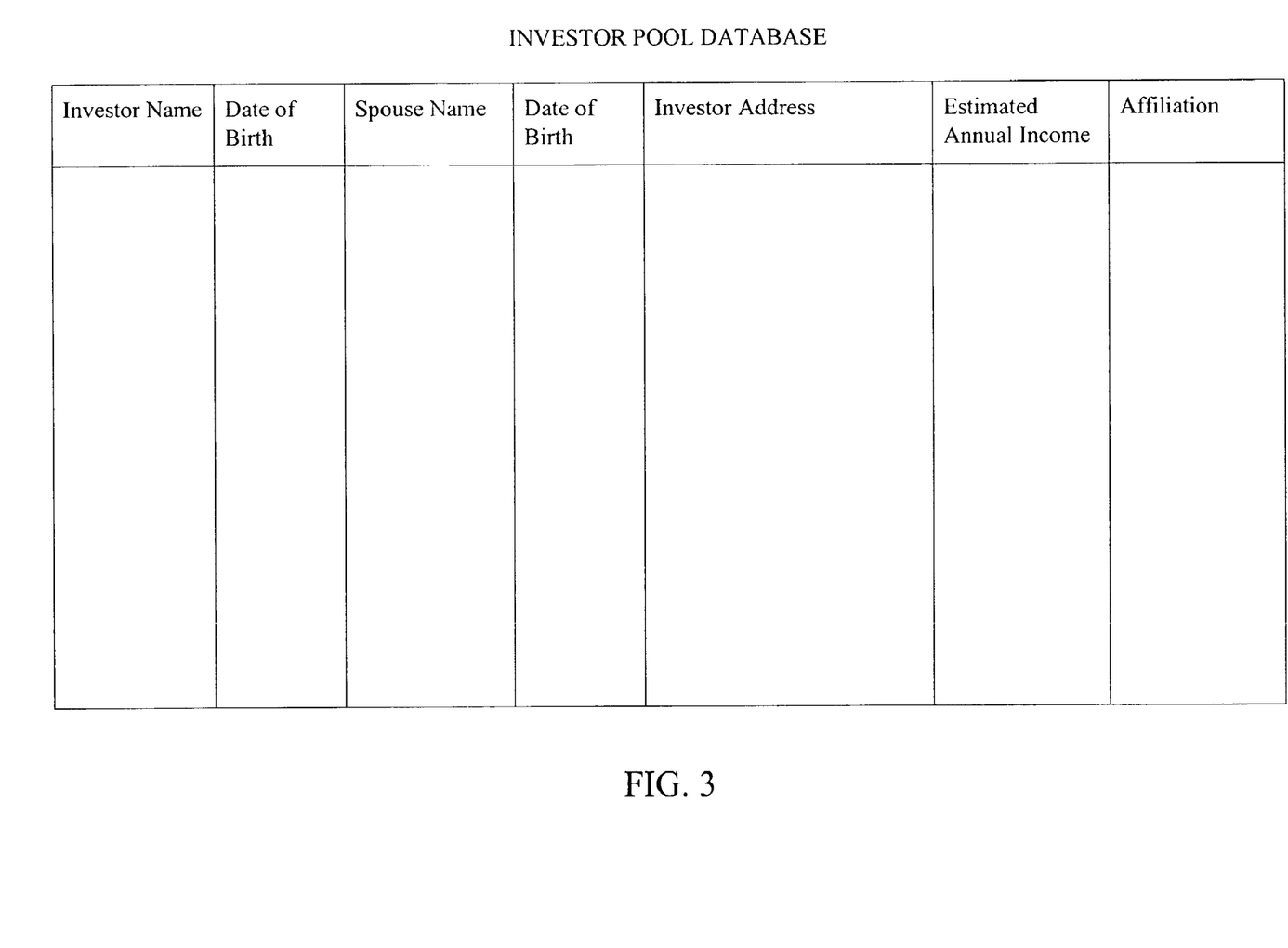
FIG. 3 illustrates an investor pool database format in accordance with an exemplary embodiment of the invention.

An investor pool database can be established by the tax-exempt organization or by a capital creation process service provider that enables the organization to search for qualified individuals in the investor pool by accessing the service provider's web site where such potential investor information can be stored for remote access. Since age, wealth and affiliation are important factors for selecting the potential investors for purchasing the bonds, these factors are included in the searchable database. FIG. 3 provides an example format showing several of the fields that are likely to be included in the investor pool database. These include investor name and date of birth, spouse name and date of birth, investor address (business or home), estimated annual income (alternatively, estimated net worth) and affiliation with the organization.

After a pool of potential investors is located and invited to participate in the purchase of tax-exempt bonds, the interested parties execute a non-binding "letter of intent" indicating their level of participation in the capital creation process. The institution then gains approval through normal regulatory processes to proceed with the financing of the capital projects through the issuance of tax-exempt bonds. The institution issues the bonds, which are then purchased by the group of interested investors. The institution is then in receipt of the funds it sought for the capital projects identified and can deploy those funds accordingly.

Following the purchase of the funds by the investors, those investors electing to participate in the capital creation process proceed to contribute their bond holdings to a Charitable Remainder Annuity Trust (CRAT). Each investor establishes his or her own CRAT, retaining income rights from the CRAT for life, and the life of a spouse or other person if desired. Following the investor's donation to his individual CRAT, the bonds are now owned by the CRAT. The tax-free interest paid on the bond debt is paid to the CRAT, the CRAT then pays the annuity amount to the income beneficiaries of the CRAT. The annuity amount is equal to the tax-free income the CRAT subsequently receives. The income beneficiaries of the CRAT are the investor for life and then the investor's spouse, if desired. The income beneficiaries should receive the tax-free income for life.

By designating the issuing institution as irrevocable residual beneficiary of the CRAT at the deaths of the income beneficiaries, the issuing institution, which would normally enter the debt issue as a liability on its books along with the additional asset of the funds raised, now has an additional asset to add to its financial statements. This would be in the form of the residual interest in the CRAT measured by the current value of the aggregated deductions of all of the participating investors (over 41% of the total amount contributed to the CRAT in the above example).

If the average age of the investor pool was 65, the combined value of the residue of $100M in bonds committed to the capital creation process would be approximately $41M at the inception. Therefore, in addition to the normal financial entries of 1100M of debt and $100M in assets, the issuing institution would add an additional $41M in assets to its financial statement, a demonstrative and positive result for its debt capacity impact and its financial ratios. Each year, this additional asset amount would increase, due to the aging of the investor pool. As the investors move closer to death, the institution moves closer to the ultimate realization of the termination of the CRAT.

The positive results to the financial statement of the issuing institution as just described, contribute significantly to the accreditation process for a university using the capital creation process. That is, the enhancements to the institution's financial ratios are material to the accreditation process for the institution as well as the institution's financial ratings.

The statistical average of tax-exempt bond investors is more than age 65 for obvious reasons: age, security, and a need for regular and tax-favored income. The bonds issued and purchased as part of the capital creation plan process are designed to be a non-serial, thirty year, balloon bond issue. The average bond investor will reach his/her ultimate maturity years ahead of the maturity of the bonds themselves. The average life expectancy of a 65 year old couple is approximately 20 years.

At the death of the last income beneficiary of the CRAT, the income payments cease. The assets remaining in the CRAT (the bonds) are distributed to the named charitable organization, i.e., the issuer of the bonds. In effect, the institution ends up owning its own debt instruments and the debt self-extinguishes.

The investor, upon completing the initial contribution of the bonds to the CRAT, receives an income tax deduction based on the age of the income beneficiaries of the CRAT and the value of the retained income interest. The older the income beneficiary, the higher the tax deduction and the higher the net tax savings to the contributor. The current tax deduction for a 65 year old couple retaining a 5% annuity interest in the CRAT for the life of both, is approximately 41% of the value of the property donated.

The capital creation process contemplates that the investor will use the savings generated by the tax deduction to purchase a single premium life insurance policy with a death benefit at least equal to the net amount of the original bond investment that could be passed to the investor's children or other beneficiaries. If the investor had personally owned the bonds at death, the asset would be included in the investor's estate for estate tax purposes. In larger estates, it is not unusual for the estate tax to consume as much as 50% of the assets or more. By creatively structuring the ownership of the life insurance policy, it is highly likely that the insurance proceeds can escape estate taxes, thereby increasing the wealth that would otherwise have passed to the investor's heirs.

In order for the wealth replacement life insurance proceeds not to be included in the taxable estate of the investor or the investor's spouse, the policy cannot be owned or controlled by the insured/CRAT income beneficiaries. The capital creation process contemplates that the insurance policy will be owned by an Irrevocable Life Insurance Trust (ILIT), established for the ultimate benefit of the investor's children or other individuals. There are other ownership options available for consideration under the capital creation process; however, the ILIT is likely to be the simplest.

As a result of the capital creation process, the institution receives the capital it currently needs to fund projects identified at competitive market interest rates. Its real or effective cost is the interest payment on the bonds, or more accurately, the present value of the stream of interest payments anticipated over the life of the bond issue. With the average age of the "pool" of investors at 65, the interest payment period would be in the 20-year range. The present value of a 5% interest stream discounted at 9% (as an estimate of the institution's investment expectation over that same period) would be approximately 45% of the face amount of the bond issue. In essence, the institution could finance approximately 220 percent, or 2.2 times the amount of capital needs it could ordinarily do without the capital creation process. If an institution can handle a $100M debt obligation under conventional bond issue procedures, using the capital creation process, it could effectively finance $220M for approximately the same cash flow obligation. This enables an institution to accomplish significantly more today in the way of capital improvements then it could under normal procedures for raising capital. As a result, building projects can commence earlier than otherwise planned, saving substantially on construction and other costs that would escalate through delay. The other benefit to the institution is that the debt principal will be extinguished over time by using the capital creation process.

The investor in tax-exempt bonds receives tax-free income for his life and the life of his spouse, if desired. This insulates the investment assets from the claims of the creditors. The investor provides his heirs with net assets equal to or greater than that deliverable if the asset had been retained by the investor until the investor's death. Ordinarily, the investor, if he desires the income deliverable from this investment over life, would retain enough of an incidence of ownership of the asset to include it in his estate at death. As part of the capital creation process, the investor provides a bequest to the issuing institution that is instrumental in the institution's ability to reach its own objectives.

The capital creation process broadens the institution's prospective constituency in a demonstrable way. The capital creation process produces a new "population" of supporters and participants who can participate in the capital creation process, even though they are unable or unwilling to make significant current outright donations. With continued relationship building between the tax exempt organization and the investors, not only can the original bond investment be returned to the issuer for extinguishing, but an excellent case can be made for naming the institution as a beneficiary of a portion of the wealth replacement life insurance policy. Specifically, that portion would be that amount over and above the net amount that would have been received by the investor's heirs had the investor simply bought and held bonds until death under the conventional process.

As an example of the latter point, consider the following scenario. An investor purchases and holds $1M dollars in bonds. If the investor's or spouse's estate is in the 50% marginal estate tax bracket, the estate tax on the bonds would be $500,000, leaving $500,000 to be distributed to the investor's heirs. Alternatively, assume that the investor participates in the capital creation process and qualifies for $900,000 of wealth replacement insurance. The beneficiaries of the insurance proceeds will receive $900,000, most of which, if not all, will be free from estate tax. The heirs or beneficiaries are $400,000 ahead of the conventional buy and hold strategy. Serious consideration should be given by the bond investor to allocate this excess amount ($400,000) to the issuing institution. Added incentives could be considered by the institution at the inception of the capital creation process to encourage such additional philanthropy.

The capital creation process offers both the issuing institution and investor a "win-win" result. The institution obtains the funds it needs for capital improvements at definable and substantially reduced cost. The investor should receive tax-free income for life with no reduction in size of the net estate passed to his heirs, and possibly an increase.

Figure 1:
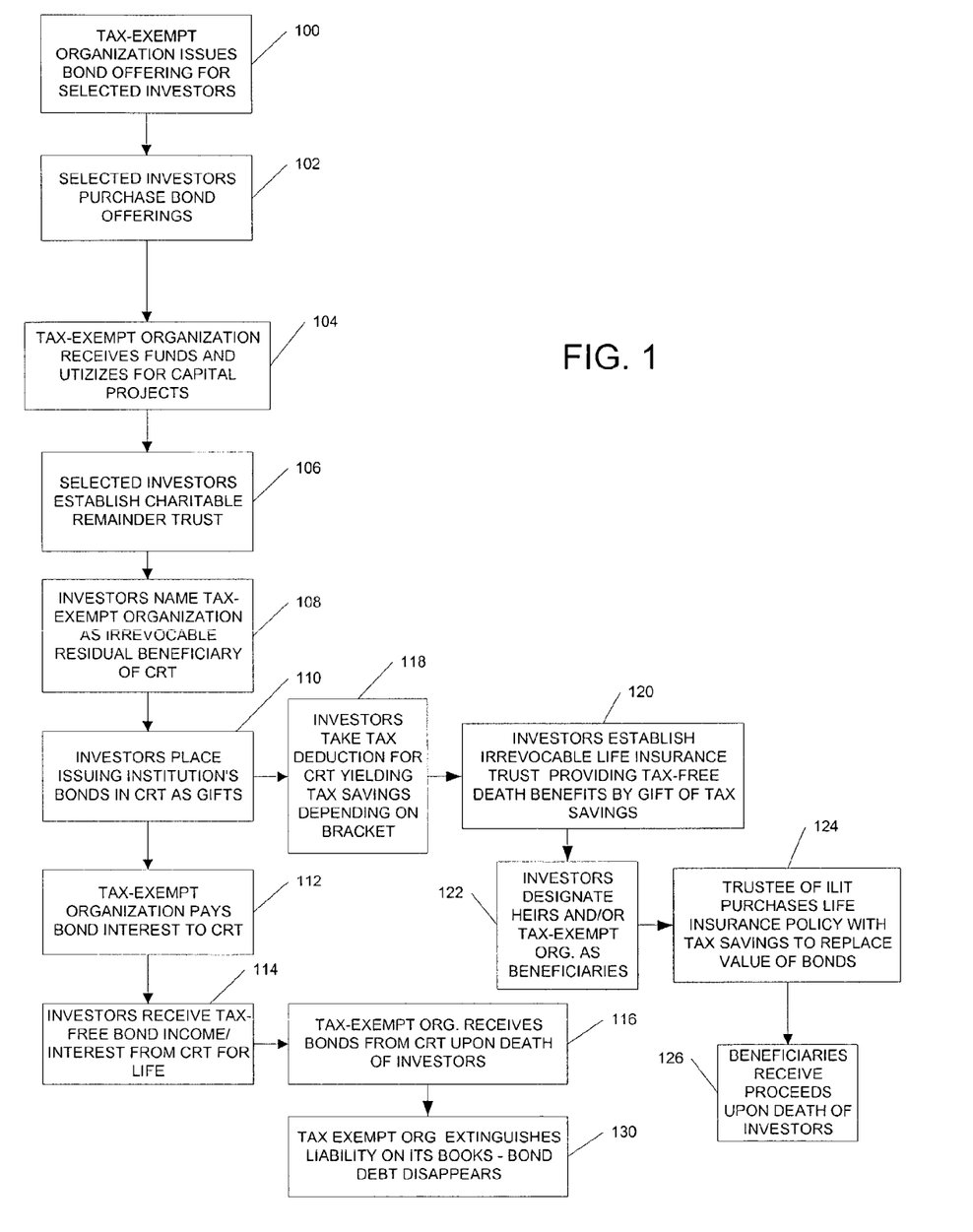
FIG. 1 illustrates the steps of the capital creation process in accordance with an exemplary embodiment of the invention.

FIG. 1 illustrates the steps performed in the capital creation process. At step 100, a tax exempt organization issues a bond offering to selected investors. The selected investors purchase these bond offerings as indicated in step 102. The tax-exempt organization receives the funds from the investors for the purchase of the tax-exempt bonds and utilizes the proceeds for capital projects as indicated in step 104. Following the purchase of the tax-exempt bonds, the selected investors establish a charitable remainder trust, as indicated in step 106. In establishing the charitable remainder trust, the investors name the tax-exempt organization as the irrevocable residual beneficiary of the CRT. This is shown in block 108 of FIG. 1. The investors then place the bonds from the issuing institution in the CRT as gifts as indicated in step 110. Periodically, and at least annually, the tax-exempt organization pays the bond interest to the CRT, as indicated in step 112. The investors receive the tax-free bond income/interest as an annuity from the CRT for life, as indicated in step 114. Upon the death of the investors, the tax exempt organization receives the bond without having to repay them, as indicated in step 116. Furthermore, the tax-exempt organization extinguishes the bond/debt liability on its books as indicated in step 130.

Following the placing of the bonds in the CRT as gifts, in step 110, the investors take a tax deduction for the CRT, yielding a tax savings that depends on the individual investor's tax bracket. This is indicated in step 118. This is followed in step 120 with the investor establishing an irrevocable life insurance trust by contributing the tax savings just described, providing tax-free death benefits to beneficiaries. In establishing the irrevocable life insurance trust, the investor designates his heirs and/or a tax-exempt organization as the beneficiaries of the life insurance trust as indicated in step 122. The trustee of the irrevocable life insurance trust purchase a life insurance policy on the investor with the tax savings contributed by the investor as indicated in step 124. The beneficiaries receive the proceeds from the life insurance trust upon the death of the investors, as indicated in step 126.

Figure 2A:
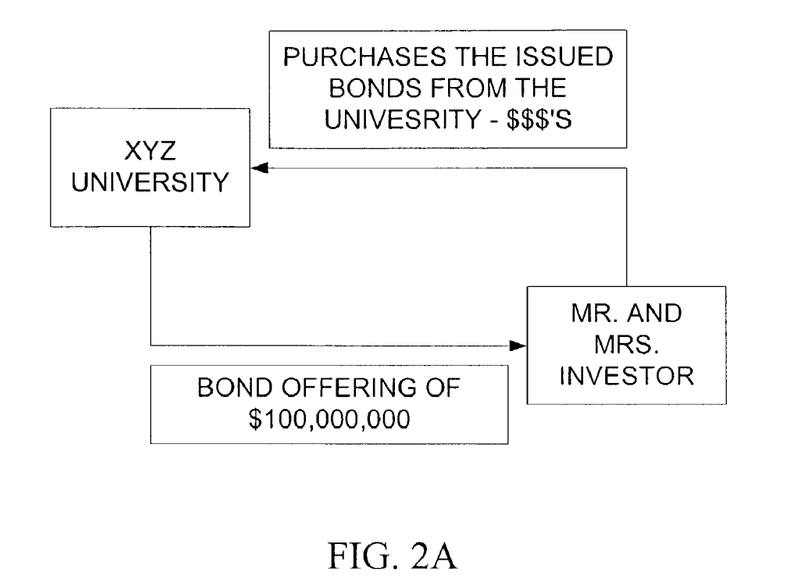
FIGS. 2A-2D illustrate an example of the use of the capital creation process of the invention.
Figure 2B:
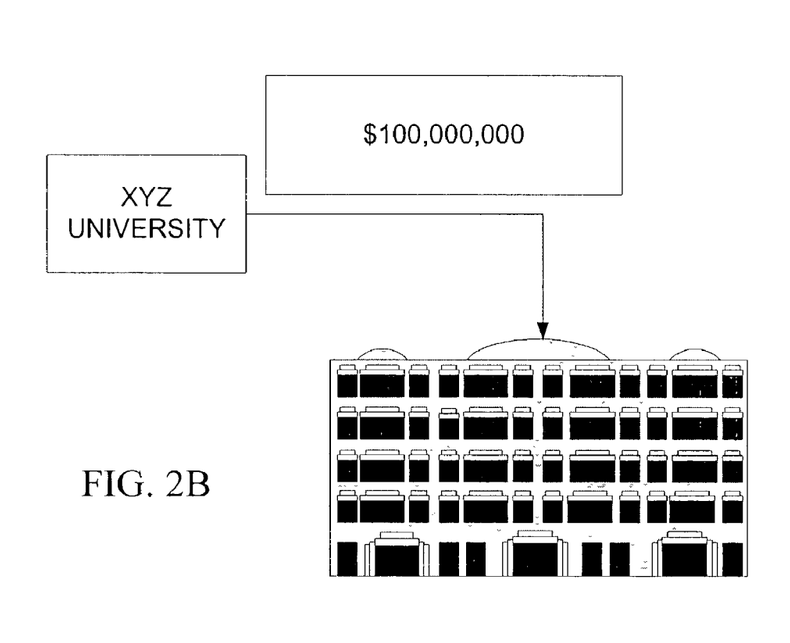
Figure 2C:
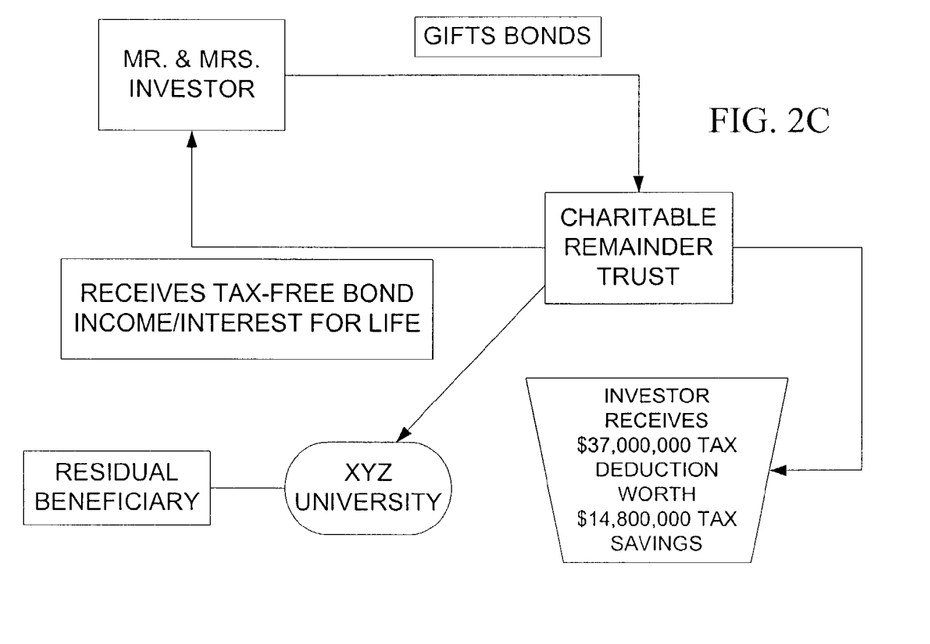
Figure 2D:
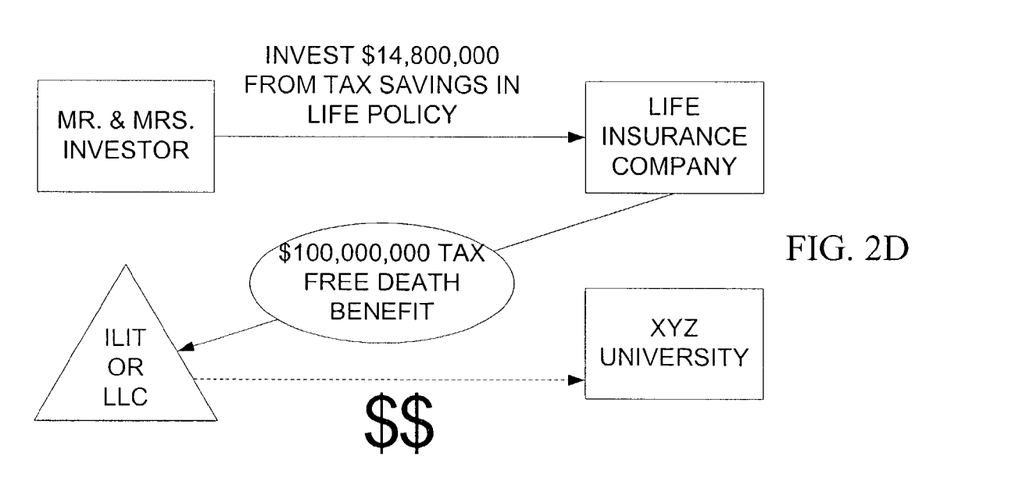

FIGS. 2A-2D illustrate an example of the use of the capital creation process of the present invention. Step 1 of the process is depicted in FIG. 2A. XYZ University makes a bond offering of $100M to potential investors. The potential investors purchase the issued bonds from the university. In this scenario, the bonds will be purchased by "friends" of XYZ University. The individual bond purchasers identified would be aged 62 and older. In step 2 of the process, XYZ University utilizes the $100M received from the investors for the capitalization of a number of identified projects. Step 3 of the process is illustrated in FIG. 2C. The investors set up a Charitable Remainder Trust with the XYZ University designated as the residual beneficiary. The investors receive tax-free bond income/interest in the form of an annuity from the CRAT for life. As a result of the gift of bonds into the Charitable Remainder Trust, the investor receives a $37M tax deduction or $14.8M in tax savings. Step 4 of the process is shown in FIG. 2D. The investors contribute the $14.8M from the tax savings to the life insurance trust with the trustee of the life insurance trust using these funds to purchase a life policy with a life insurance company. The $100M tax-free death benefit is paid to the ILIT to exclude the life insurance proceeds from inclusion in the investor's estate for estate tax purposes. Some of the proceeds of the tax-free death benefit may also go back to XYZ University as a partial beneficiary. In summary, the university receives $100M today for a cost of 5% (interest only). At the death of the investors, the university receives the proceeds (i.e., the $100M bonds) from the CRT as the irrevocable residual beneficiary. The heirs of the investors receive $100M in life insurance proceeds for replacement of the CRT assets donated to the University. Because of the typical age of the investor involved in the capital creation process of the present invention, it would generally be necessary to negotiate with the life insurance company to obtain the best possible rating for the investor for the face amount of the life insurance that the investor wants to obtain.

While the invention has been particularly shown and described with reference to an exemplary embodiment thereof, it will be understood by those skilled in the art that various changes in form and detail may be made without departing from the spirit and scope of the invention.

What is claimed is:

1. A computer-implemented capital creation process, comprises the following steps:
   I. aggregation of information on a computer in a computer database on potential investors, said information including:
      a. prospective investor-capital creation process participant name,
      b. prospective investor-capital creation process participant address,
      c. age or date of birth of prospective investor-capital creation process participant,
      d. affiliation of prospective investor-capital creation process participant with qualified organization,
      e. prospective investor-capital creation process participant spouse name
      f. prospective investor-capital creation process participant spouse age or date of birth,
      g. annual income of prospective investor-capital creation process participant,
      h. prospective investor-capital creation process participant net worth,
      i. prospective investor-capital creation process participant state of domicile, and
      j. donor history of prospective investor-capital creation process participant to affinity organizations;
   II. computer selection of selected investor participants from said database to constitute a potential tax exempt bond investor participant pool for a given qualified organization;
   III. communication to said potential investor participant pool of the opportunity to purchase bonds as part of the participation in the capital creation process;
   IV. receipt by a qualified organization from potential investors in said potential investor participant pool of a capital creation process participation agreement to purchase said bonds and to create one or more charitable remainder trusts as part of the capital creation process for the qualified organization;
   V. decision by qualified organization to proceed with the issuance of tax exempt bonds for the purpose of meeting qualified organization's capital formation needs and for the further purpose of furnishing prospective capital creation process investor participants with the opportunity to purchase the qualified organization's tax exempt bonds;
   VI. issuance by the qualified organization of the tax exempt bonds;
   VII. purchase by the selected capital creation process investors, derived through the computer selected investor pool, of the bonds issued by the qualified organization;
   VIII. receipt by the qualified organization of purchase funds from the participating investors for the bonds issued by the qualified organization;
   IX. establishment by the participating capital creation process investors of one or more charitable remainder trusts, specifically (a) designating the income beneficiaries of each charitable remainder trust, and (b) designating the qualified organization as the irrevocable qualified charitable remainder beneficiary of said charitable remainder trusts;

X. contribution to the charitable remainder trust, by the participating investor, of the bonds which are purchased by the investor from the qualified organization;

XI. entry by the qualified organization in its financial records of a debt issue related liability of the bonds debt, the related bond sale proceeds as a balance sheet asset, and a charitable remainder trust asset, resulting from the designation of that qualified organization as the irrevocable charitable remainder beneficiary of the charitable remainder trust, the asset value determined by the calculation of the present value interest of the qualified organization as the irrevocable charitable remainder beneficiary in each of the capital creation process charitable remainder trusts;

XII. periodic payment by the qualified organization to the charitable remainder trust of interest on bond debt related to the bonds that are contributed by the participating investors to the charitable remainder trust;

XIII. periodic payment by the charitable remainder trust of the designated charitable remainder trust income to the income beneficiaries of each charitable remainder trust;

XIV. annual revaluation on a computer of each charitable remainder trust to determine each successive year's present value interest of the irrevocably designated charitable remainder beneficiary so that such changing value can be accurately reflected in the financial records of the qualified organization;

XV. subsequent termination of each charitable remainder trust which is part of the capital creation process upon (a) the death of each charitable remainder trust's income beneficiaries, or, (b) upon the completion of a specified number of years, not to exceed 20 years, whichever one of these two choices has been selected in each charitable remainder trust that is part of this capital creation process;

XVI. distribution to the qualified organization, upon said termination of the charitable remainder trust as the irrevocable remainder beneficiary of the charitable remainder trust, of the bonds that were contributed by the participating investor to the charitable remainder trust; and XVII. the subsequent extinguishing of the qualified organization's bond debt related to the bonds that have been received by the qualified organization as the irrevocable remainder beneficiary upon said termination of the charitable remainder trusts which are part of the capital creation process.

\* \* \* \* \*

UNITED STATES PATENT AND TRADEMARK OFFICE
CERTIFICATE OF CORRECTION

| | | |
|---|---|---|
| PATENT NO. | : 7,620,593 B1 | Page 1 of 1 |
| APPLICATION NO. | : 10/184780 | |
| DATED | : November 17, 2009 | |
| INVENTOR(S) | : Leigh S. Fultz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1655 days.

Signed and Sealed this

Twenty-sixth Day of October, 2010

David J. Kappos
*Director of the United States Patent and Trademark Office*